(12) United States Patent
Noridomi et al.

(10) Patent No.: US 7,315,621 B2
(45) Date of Patent: Jan. 1, 2008

(54) DIGITAL WATERMARK-EMBEDDING APPARATUS, DIGITAL WATERMARK-EMBEDDING METHOD, AND RECORDING MEDIUM

(75) Inventors: Kenichi Noridomi, Fukuoka (JP); Hisashi Inoue, Fukuoka (JP); Takashi Katsura, Fukuoka (JP); Takanori Okada, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 825 days.

(21) Appl. No.: 10/431,503

(22) Filed: May 8, 2003

(65) Prior Publication Data

US 2003/0210784 A1    Nov. 13, 2003

(30) Foreign Application Priority Data

May 13, 2002    (JP)    ............................. 2002-136698

(51) Int. Cl.
  *H04N 7/167*    (2006.01)
  *H04K 1/00*     (2006.01)
  *G09C 3/08*     (2006.01)
  *G09C 3/00*     (2006.01)
  *H04N 1/387*    (2006.01)
  *G06T 1/00*     (2006.01)
  *G09C 5/00*     (2006.01)

(52) U.S. Cl. ........................... 380/202; 380/51; 380/54; 380/232; 380/250

(58) Field of Classification Search ................ 380/202, 380/51, 54, 232, 250; 713/176, 177, 178, 713/179
See application file for complete search history.

(56) References Cited

U.S. PATENT DOCUMENTS

| 7,197,164 B2 * | 3/2007 | Levy ........................... 382/100 |
| 2002/0181706 A1 * | 12/2002 | Matsumura et al. ......... 380/205 |
| 2006/0120559 A1 * | 6/2006 | Levy ........................... 382/100 |

FOREIGN PATENT DOCUMENTS

| EP | 984616 A2 * | 3/2000 |
| JP | 11-346302 | 12/1999 |

OTHER PUBLICATIONS

In-Koo Kang et al., "Applications I: Implementation of real-time watermariking scheme for high-quality video", Proceeding of the 8th worshop on Multimedia and security MM&SEC '06, Sep. 2006, pp. 124-129.*

(Continued)

*Primary Examiner*—Matthew Smithers
*Assistant Examiner*—Courtney D. Fields
(74) *Attorney, Agent, or Firm*—Wenderoth, Lind & Ponack, L.L.P.

(57) ABSTRACT

A characteristic amount is retained and calculated from an entered video signal. Embedment intensity is retained and calculated from the retained characteristic amount. Embedment information is embedded as digital watermarks into the entered video signal in accordance with the retained embedment intensity of the previous frame or field that is located at a position earlier in time than a target image subject to digital watermark embedment. As a result, an output signal of video having the digital watermarks embedded therein is produced. The digital watermarks are embedded into the target image with reference to another image located at a position earlier in time than the target image. Such digital watermark embedment suppresses a delay in output of an output image with reference to an input image.

20 Claims, 9 Drawing Sheets

OTHER PUBLICATIONS

Nidhal Abdulaziz, "Wavelet Transform and Channel Coding for Data Hiding in Video", Info-Tech and Info-Net, Proceedings, Beijing, Piscataway, NJ, USA, IEEE, vol. 2, Oct. 29, 2001-Nov. 1, 2001, pp. 791-796.

Mauro Barni et al., "Watermark Embedding: Hiding a Signal Within a Cover Image", IEEE Communications Magazine, IEEE Service Center, Piscataway, US, vol. 39, No. 8, Aug. 2001, pp. 102-108.

Jiwu Huang et al., "Adaptive Image Watermarking Scheme Based on Visual Masking", Electronics Letters, IEE Stevenage, GB, vol. 34, No. 8, Apr. 16, 1998, pp. 748-750.

F.M. Boland et al., "Watermarking Digital Images for Copyright Protection", Image Processing and its Applications, Fifth International Conference on Edinburgh, UK, London, IEE, 1995, pp. 326-330.

F. Hartung et al., "Digital Watermarking of MPEG-2 Coded Video in the Bitstream Domain", Acoustics, Speech, and Signal Processing, ICASSP-97, IEEE International Conference on Munich, Germany, Los Alamitos, CA, USA, vol. 4, Apr. 21, 1997-Apr. 24, 1997, pp. 2621-2624.

\* cited by examiner

DIGITAL WATERMARK-EMBEDDING APPARATUS, DIGITAL WATERMARK-EMBEDDING METHOD, AND RECORDING MEDIUM

BACKGROUND OF THE INVENTION

1. Field of the Invention

The present invention relates to a digital watermark-embedding apparatus designed to embed information as digital watermarks into a target image subject to digital watermark embedment in an entered video signal, and an art related thereto.

2. Description of the Related Art

Recent digital content such as digitized audio and digitized video data is on the increase. With digital content it is easy to provide a faithful reproduction of original content. Therefore, it is an important issue to protect the copyright of the digital content. Illegally reproduced or distributed content is very difficult to differentiate from corresponding original content. This fact involves difficulties in demonstrating an evidence to assert the copyright of the content. As a result, efforts have been made to protect the copyright of digital content.

A "digital watermark" is used as one of the efforts. The digital watermark is an art of embedding data into the audio or video data without allowing users to perceive the presence of the embedded data.

A prior art digital watermark-embedding apparatus has been disclosed in published Japanese Patent Application Laid-Open No. 11-346302.

The prior art is now described in detail with reference to FIG. 9. FIG. 9 is a block diagram, illustrating the prior art digital watermark-embedding apparatus.

In FIG. 9, a category-classifying unit 904 calculates a characteristic amount for an input image, and then determines, from the calculated characteristic amount, a category under which the image falls. The category-classifying unit 904 feeds a corresponding category index to an accumulation apparatus 902.

The accumulation apparatus 902 has a digital watermark characteristic table for each of the category indexes that are provided from the category-classifying unit 904, and selects a proper characteristic table in accordance with each of the entered category indexes. The digital watermark characteristic table describes a relationship between digital watermark intensity, a degree of degradation in image quality, and an evaluation of robustness against image processing.

The accumulation apparatus 902 determines, using the selected characteristic table, the degree of degradation in image quality and the evaluation of robustness against image processing in response to the digital watermark intensity that is fed from a digital watermark intensity-calculating unit 901. The accumulation apparatus 902 feeds the determined degree of degradation in image quality and the determined evaluation of robustness against image processing to the digital watermark intensity-calculating unit 901.

The digital watermark intensity-calculating unit 901 feeds various levels of digital watermark intensity into the accumulation apparatus 902, and then determines optimum digital watermark intensity with reference to the degree of degradation in image quality and the evaluation of toughness from the accumulation apparatus 902. The digital watermark intensity-calculating unit 901 delivers the calculated optimum digital watermark intensity to a digital watermark-embedding unit 903.

The digital watermark-embedding unit 903 converts embedded data into digital watermarks, and then embeds the digital watermarks into the input image in accordance with the optimum digital watermark intensity, thereby providing a digital watermark-embedded image.

OBJECTS AND SUMMARY OF THE INVENTION

According to the prior art, a characteristic amount is calculated from a target image subject to digital watermark embedment in an entered video signal. Digital watermarks are embedded into an input image at embedment intensity that is set according to the calculated characteristic amount. As a result, an output image having the digital watermarks embedded therein is produced.

This system inevitably involves a time delay when characteristic amount calculation, embedment intensity calculation, and digital watermark embedment are practiced. In particular, when moving pictures are treated as input images, the prior art system brings about a delay that corresponds to at least one regeneration unit (a frame or field).

A first object of the present invention is to provide an art capable of suppressing a delay in output of an output image with reference to an input image.

According to the prior art, the digital watermarks are embedded into a monotonous image, typically an image colored in near solid black. In this instance, patterns of the embedded digital watermarks are often rendered conspicuous. As a result, the digital watermarks are easy to analyze, and degradation in image quality is pronounced.

A second object of the present invention is to provide an art capable of rendering the digital watermarks difficult to analyze, and capable of suppressing degradation in image quality.

According to the prior art, a single characteristic amount is calculated from the entire input image to embed the digital watermarks into the image.

When attention is directed to part of the image, it is observed that there is deviation in amount of digital watermark embedment-caused variations in pixel value. The deviation reduces the robustness of the digital watermarks when part of the image is removed from the image. For example, assume that the digital watermarks are embedded into an image about edges of the image, and that the image has a subtitle on video of nature. In this instance, the digital watermarks are strongly embedded at the subtitle. As a result, when the subtitle is removed from the image, then the digital watermarks have a reduced degree of robustness.

A third object of the present invention is to provide an art capable of reducing deviation in amount of digital watermark embedment-caused variations in pixel value within an image, and capable of increasing digital watermark robustness.

According to the prior art, when moving pictures are handled, different pieces of embedment information for each image are embedded into a chain of less diversified, monotonous images.

Consequently, degradation in image quality becomes apparent. For example, when different pieces of embedment information for each image are embedded into a series of less diversified images such as a still image, then digital watermark embedment-caused variations are perceivable because substantially no variations in the images are observed. As a result, there are cases where flickers are seen in the moving pictures.

A fourth object of the present invention is to provide an art capable of suppressing degradation in image quality in a less diversified image.

In view of the above, a first aspect of the present invention provides a digital watermark-embedding apparatus operable to embed a digital watermark into a target image subject to digital watermark embedment in an entered video signal, comprising: a digital watermark-embedding unit operable to embed the digital watermark into the target image with reference to a different image located at a position earlier, with respect to a time axis, than the target image.

This construction embeds the digital watermarks into the target image with reference to the previous image located at a position earlier in time than the target image. This feature deters a delay in output of an output image with reference to an input image.

A second aspect of the present invention provides a digital watermark-embedding apparatus as defined in the first aspect of the present invention, wherein the different image is an adjacent frame or field image positioned nearest, with respect to the time axis, to the target image.

This construction embeds the digital watermarks into the present frame or field image with reference to the adjacent frame or field image nearest to the present frame or field image. This feature restrains a delay in output of an output image with reference to an input image, and suppresses degradation in image quality.

A third aspect of the present invention provides a digital watermark-embedding apparatus operable to selectively embed a digital watermark into a target image subject to digital watermark embedment in an entered video signal, comprising: a parameter-calculating unit operable to calculate a parameter that shows image complexity; and a digital watermark-embedding unit operable to embed the digital watermark into the target image only when the parameter calculated by the parameter-calculating unit meets a certain condition that shows the image complexity.

This construction does not embed the digital watermarks into a monotonous image with reference to the parameter having the image complexity expressed in numerical terms. This feature makes it difficult to analyze the digital watermarks, and suppresses degradation in image quality.

A fourth aspect of the present invention provides a digital watermark-embedding apparatus as defined in the third aspect of the present invention, wherein the digital watermark-embedding unit embeds the digital watermark into the target image with reference to a different image located at a position earlier, with respect to a time axis, than the target image.

This construction renders the digital watermarks difficult to analyze, and inhibits degradation in image quality. In addition, the above construction embeds the digital watermarks with reference to the previous image at a position earlier in time than the target image, and consequently deters a delay in output of an output image with reference to an input image.

A fifth aspect of the present invention provides a digital watermark-embedding apparatus operable to embed a digital watermark into a target image subject to digital watermark embedment in an entered video signal, comprising: an area-dividing unit operable to divide the target image into several local regions; and a digital watermark-embedding unit operable to embed the digital watermarks into the target image at the local regions divided by the area-dividing unit.

The construction embeds the digital watermarks into the target image at each of the divided local regions thereof. This feature provides reduced deviation in amount of digital watermark embedment-caused variations in pixel value within the image, and provides enhanced digital watermark robustness.

A sixth aspect of the present invention provides a digital watermark-embedding apparatus as defined in the fifth aspect of the present invention, wherein the digital watermark-embedding unit embeds the digital watermarks into the target image at the local regions divided by the area-dividing unit, the digital watermarks being embedded with reference to corresponding local regions of another image that is located at a position earlier, with respect to a time axis, than the target image.

This construction eliminates deviation in amount of digital watermark embedment-caused variations in pixel value within the image, and provides increased digital watermark robustness. In addition, the above construction embeds the digital watermarks with reference to the previous image at a position earlier in time than the target image, and consequently suppresses a delay in output of an output image with reference to an input image.

A seventh aspect of the present invention provides a digital watermark-embedding apparatus operable to embed a digital watermark into a target image subject to digital watermark embedment in an entered video signal, comprising: a digital watermark-embedding unit operable to embed the digital watermark into the target image in accordance with a difference between two selected images, the two selected images including the target image or otherwise another image located at a position earlier, with respect to a time axis, than the target image.

This construction uses a difference between the two selected images, and consequently suppresses degradation in image quality in a less diversified image. In addition, the above construction selects, as one of the two images, the previous image located at a position earlier, with respect to the time axis, than the target image, and consequently inhibits a delay in output.

An eighth aspect of the present invention provides a digital watermark-embedding apparatus as defined in the seventh aspect of the present invention, wherein the two selected images are the target image and an adjacent image positioned nearest, with respect to the time axis, to the target image.

This construction suppresses degradation in image quality in a less diversified image. In addition, the above construction uses a difference between the target image and the adjacent image nearest, with respect to the time axis, to the target image, and consequently precisely identifies the less diversified image.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Important concepts in the present invention are initially discussed before specific descriptions of composition according to the present invention are made.

The term "characteristic amount" as given herein refers to a value calculated on the basis of pixel values in an image at a certain area thereof. The certain area of the image is made up of plural pixels, and is equivalent to, e.g., the entire single frame or field, or otherwise a local region obtained by diving the single frame or field into the limited number of pieces. The characteristic amount shows characteristics of the image at the certain area thereof.

More specifically, the characteristic amount may include a sum of luminance values in the image at the certain area thereof, an average of luminance components in the image at the certain area thereof, a sum of differential absolute values of horizontally neighboring pixels in the image at the certain area thereof, and a sum of differential absolute values of vertically neighboring pixels in the image at the certain area thereof. That is, the characteristic amount may be any one of them, or a combination of them. The characteristic amount according to the present invention may be selected from among the above items.

The term "embedment intensity" as set forth herein refers to an index to show the intensity of digital watermarks embedded into the image at the certain area thereof.

There is a trade-off relationship between digital watermark embedment-caused image quality degradation and digital watermark robustness. The digital watermark robustness refers to a degree to which the digital watermarks are retained in the image, even after the image is subjected to image processing such as image compression, noise addition, and dubbing using an analog recorder. The embedment intensity as mentioned above refers to a parameter to adjust the relationship between the image quality degradation and the digital watermark robustness.

An increased level of embedment intensity increases degradation in image quality of an image having the digital watermarks embedded therein, but enhances the robustness against the image processing. Conversely, a reduced level of embedment intensity inhibits the image quality degradation, but reduces the robustness against the image processing.

First Embodiment

A first embodiment of the present invention is now described with reference to the drawings.

Figure 1:
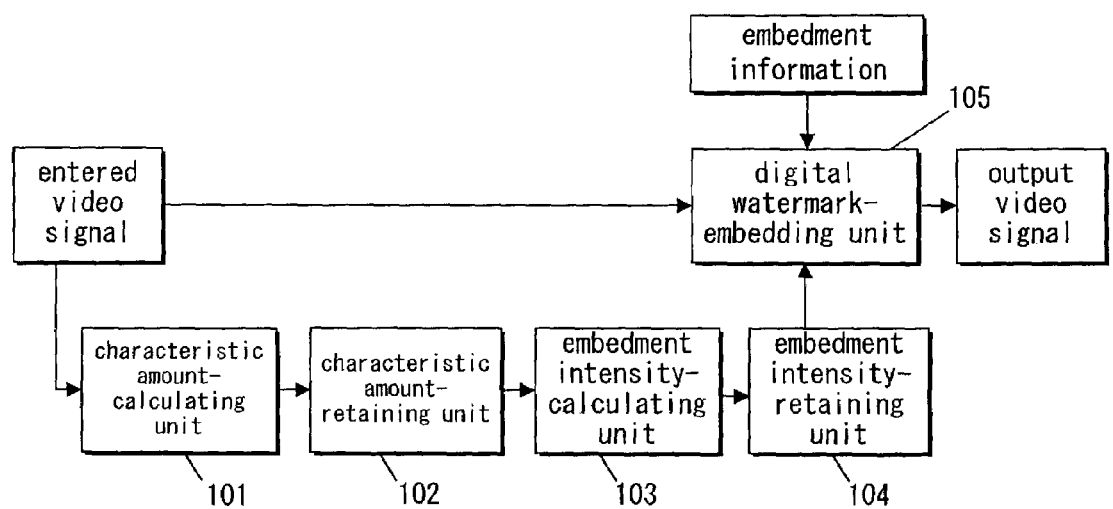
FIG. 1 is a block diagram, illustrating an exemplary digital watermark-embedding apparatus according to a first embodiment of the present invention.

FIG. 1 is a block diagram, illustrating an exemplary digital watermark-embedding apparatus according to the present embodiment.

As illustrated in FIG. 1, the digital watermark-embedding apparatus includes a characteristic amount-calculating unit 101, a characteristic amount-retaining unit 102, an embedment intensity-calculating unit 103, an embedment intensity-retaining unit 104, and a digital watermark-embedding unit 105.

The characteristic amount-calculating unit 101 calculates a characteristic amount for a target image subject to digital watermark embedment from an entered video signal. The calculated characteristic amount is retained in the characteristic amount-retaining unit 102 that includes a memory, or otherwise a hard disc.

The embedment intensity-calculating unit 103 calculates embedment intensity on the basis of the characteristic amount held in the characteristic amount-retaining unit 102. The calculated embedment intensity is retained in the embedment intensity-retaining unit 104.

The digital watermark-embedding unit 105 embeds the digital watermarks into the target image in accordance with the embedment intensity retained in the embedment intensity-retaining unit 104.

Figure 2:
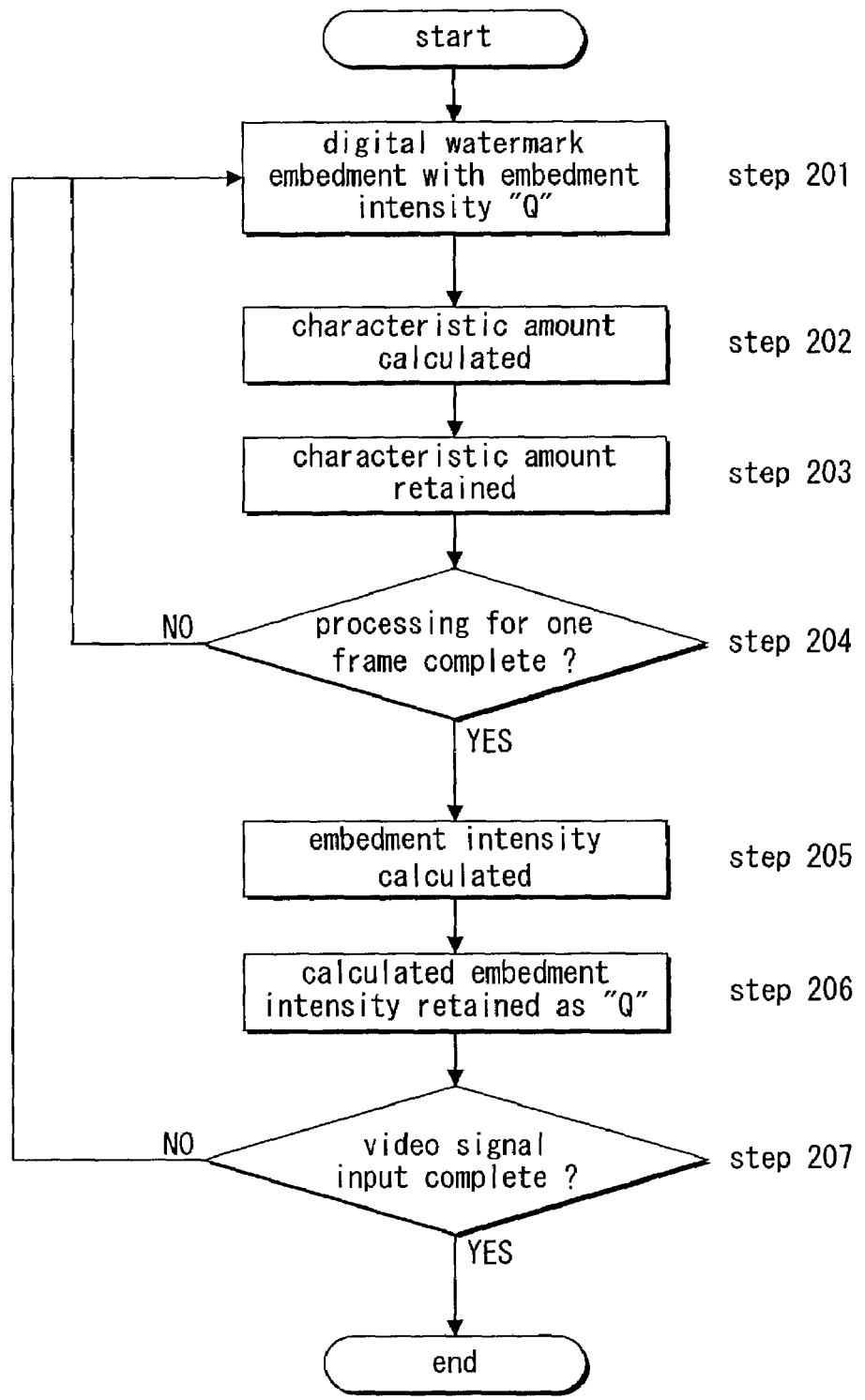
FIG. 2 is an exemplary flowchart, illustrating how the digital watermark-embedding apparatus of FIG. 1 is operated.

The following discusses, with reference to FIGS. 1 and 2, the way in which digital watermark embedment according to the present embodiment is practiced. FIG. 2 is an exemplary flowchart, illustrating how the digital watermark-embedding apparatus of FIG. 1 is operated.

At step 201, the digital watermark-embedding unit 105 embeds given embedment information as digital watermarks into a target image subject to digital watermark embedment in an entered video signal. At this time, the embedment information is embedded in accordance with embedment intensity "Q". As a result, a signal of video having the digital watermarks embedded therein is generated.

The embedment intensity-calculating unit 103 renews embedment intensity Q. Pre-renewed embedment intensity Q is a predetermined initial value.

Pursuant to the present embodiment, at step 201, embedment intensity calculated from an image that exists one frame short (i.e., before) of the target image is placed into embedment intensity Q.

At step 202, the characteristic amount-calculating unit 101 calculates a characteristic amount from the entered video signal. At step 203, the characteristic amount-retaining unit 102 retains the calculated characteristic amount. According to the present embodiment, a sum of luminance values is employed as a characteristic amount.

At step 204, the characteristic amount-calculating unit 101 determines whether or not the processing from steps 201 to 203 for one frame has been completed. When the determination in step 204 results in "YES", then at step 205, the embedment intensity-calculating unit 103 calculates embedment intensity on the basis of the characteristic amount held in the characteristic amount-retaining unit 102.

According to the present embodiment, the embedment intensity is calculated using an arithmetic function that treats a sum of luminance values for one frame as a variable. However, this is offered merely for purposes of illustration. When the determination in step 204 results in "NO", then the processing from steps 201 to 203 is repeated.

At step 206, the embedment intensity-retaining unit 104 retains, as embedment intensity "Q", the embedment intensity calculated by the embedment intensity-calculating unit 103.

At step 207, the digital watermark-embedding unit 105 determines whether or not video signal input is completed. When the determination in step 207 results in "YES", then the entire processing is terminated. When the determination in step 207 results in "NO", then the routine is returned to step 201 to continue the processing.

As described above, the digital watermark-embedding apparatus according to the present embodiment retains and calculates the embedment intensity on the basis of the characteristic amount for the image that exists one frame short of the target image, and then practices the digital watermark embedment in accordance with such retained embedment intensity.

This feature suppresses a delay in output of a signal of video having the digital watermarks embedded therein, with reference to the entered video signal.

According to the present embodiment, the embedment intensity calculated from the image that exists one frame short of the target image is employed as embedment intensity for use in digital watermark embedment. The use of embedment intensity calculated from any one of the previous frames located at positions earlier in time than the present frame also provides beneficial effects substantially similar to the above. In particular, the use of embedment intensity calculated from an adjacent frame image nearest in time to the present frame image makes it feasible to suppress degradation in image quality.

According to the present embodiment, the frame image is employed. Alternatively, a field image may be used. Similarly, the use of embedment intensity calculated from any one of the previous fields located at positions earlier in time than the present field also provides beneficial effects substantially similar to the above.

According to the present embodiment, a sum of luminance values is used as a characteristic amount. Alternatively, a characteristic amount selected from any one of an average of luminance components, a sum of differential absolute values of horizontally and vertically neighboring pixels, and a combination of the former may be used. The digital watermark embedment conducted by calculating a further characteristic amount that matches with the visual characteristics of human beings renders degradation in image quality less noticeable, and provides increased embedment intensity. At any rate, the characteristic amount is not limited to those discussed in the present embodiment.

According to the present embodiment, a function that treats a sum of luminance values as a variable is used to calculate the embedment intensity. Alternatively, any function treating the characteristic amount as a variable may be selected.

Second Embodiment

A second embodiment of the present invention is now described with reference to the drawings.

The present embodiment differs from the previous embodiment in terms of selective embedment of digital watermarks into only images (non-monotonous images) that meet a certain condition, not into all target images subject to digital watermark embedment.

Figure 3:
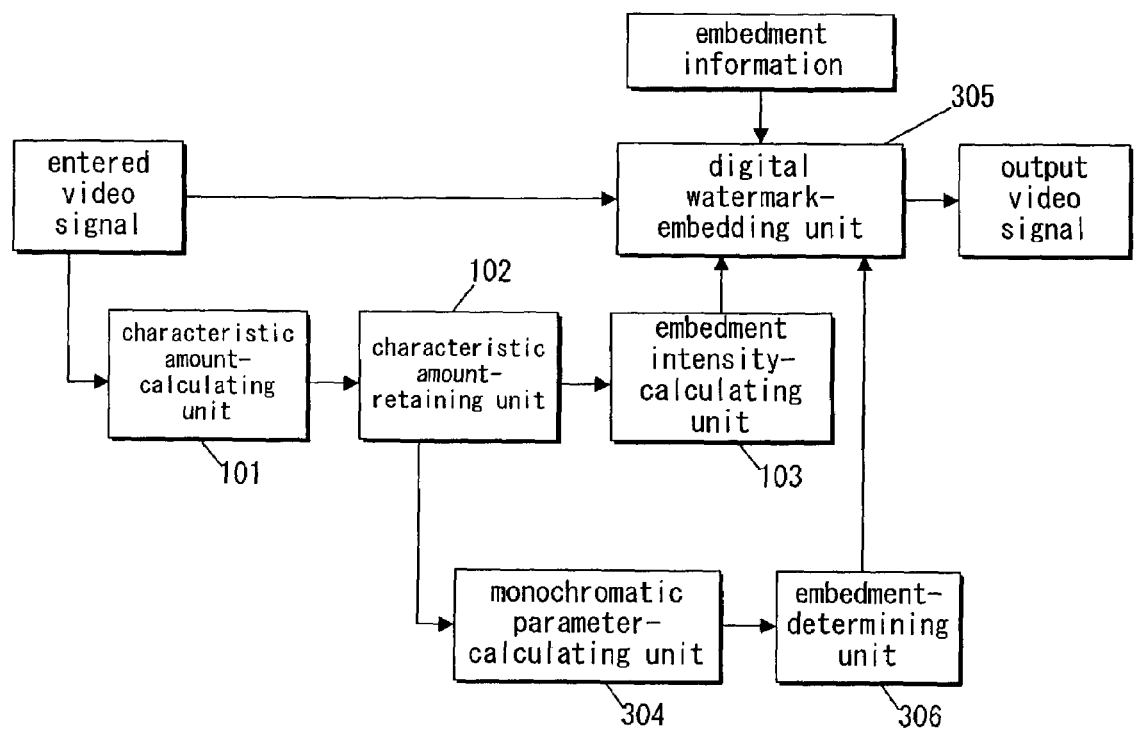
FIG. 3 is a block diagram, illustrating an exemplary digital watermark-embedding apparatus according to a second embodiment.

FIG. 3 is a block diagram, illustrating a digital watermark-embedding apparatus according to the present embodiment.

As illustrated in FIG. 3, the digital watermark-embedding apparatus according to the present embodiment includes a characteristic amount-calculating unit 101, a characteristic amount-retaining unit 102, an embedment intensity-calculating unit 103, a monochromatic parameter-calculating unit 304, an embedment-determining unit 306, and a digital watermark-embedding unit 305.

The monochromatic parameter-calculating unit 304 acts as a parameter-calculating unit, and calculates a parameter that shows image complexity.

The embedment-determining unit 306 determines whether or not the parameter calculated by the monochromatic parameter-calculating unit 304 satisfies a certain condition that shows the image complexity.

The digital watermark-embedding unit 305 embeds digital watermarks into only images that are determined to meet the certain condition.

Figure 4:
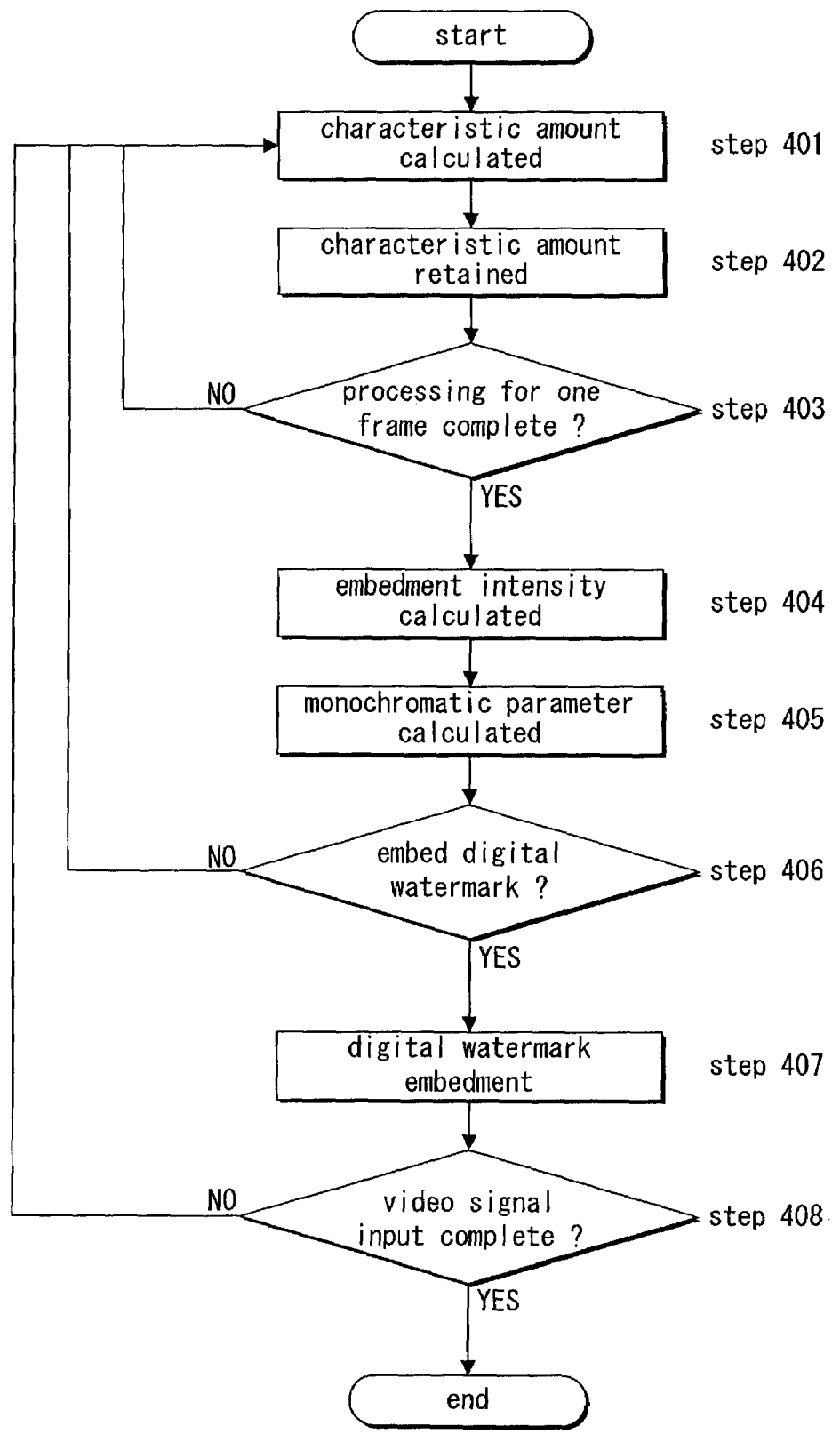
FIG. 4 is an exemplary flowchart, illustrating how the digital watermark-embedding apparatus of FIG. 3 is operated.

The following discusses, with reference to FIGS. 3 and 4, the way in which digital watermark embedment according to the present embodiment is practiced. FIG. 4 is an exemplary flowchart, illustrating how the digital watermark-embedding apparatus of FIG. 3 is run.

At step 401, the characteristic amount-calculating unit 101 calculates a characteristic amount from a target image subject to digital watermark embedment in an entered video signal. At step 402, the characteristic amount-retaining unit 102 retains the calculated characteristic amount. Pursuant to the present embodiment, a sum of differential absolute values of horizontally and vertically neighboring pixels and a sum of luminance values are employed as characteristic amounts.

At step 403, the characteristic amount-calculating unit 101 determines whether or not the processing from steps 401 to 402 for one frame has been completed. When the determination in step 403 results in "YES", then at step 404, the embedment intensity-calculating unit 103 calculates embedment intensity on the basis of the characteristic amount held in the characteristic amount-retaining unit 102. According to the present embodiment, the embodiment intensity is calculated using a function that treats a sum of luminance values for one frame as a variable. When the determination in step 403 results in "NO", then the processing from steps 401 to 403 is repeated.

At step 405, the monochromatic parameter-calculating unit 304 calculates a monochromatic parameter from the characteristic amount held in the characteristic amount-retaining unit 102. The monochromatic parameter displays image complexity expressed in numerical figures. According to the present embodiment, the monochromatic parameter is calculated using an increasing function that handles a sum of differential absolute values of horizontally and vertically neighboring pixels for one frame as a variable.

At step 406, the embedment-determining unit 306 determines whether or not the calculated monochromatic parameter is equal or greater than a threshold. When the determination in step 406 results in "YES", then the routine is advanced to step 407. When the determination in step 406 results in "NO", then the routine is returned to step 401 without digital watermark embedment.

An increase in sum of differential absolute values of horizontally and vertically neighboring pixels results in an image having more edges, with a consequential increase in image complexity. According to the present embodiment, the threshold is set to produce a close monochromatic image when the monochromatic parameter is less than the threshold.

At step 407, the digital watermark-embedding unit 305 embeds given embedment information as digital watermark into the target image subject to digital watermark embedment in the entered video signal. At this time, the embedment information is embedded in accordance with the embedment intensity calculated by the embedment intensity-calculating unit 103. As a result, a signal of video having the digital watermarks embedded therein is generated.

At step 408, the digital watermark-embedding unit 305 determines whether or not video signal input has been completed. When the determination in step 408 results in "YES", then the entire processing is terminated. When the determination in step 408 results in "NO", then the routine is returned to step 401 to continue the processing.

As described above, the digital watermark-embedding apparatus according to the present embodiment calculates the monochromatic parameter on the basis of the characteristic amount for the image, and does not embed the digital watermarks into near monochromatic images with reference to the calculated monochromatic parameter.

This feature makes it difficult to analyze the digital watermarks, and suppresses degradation in image quality.

Pursuant to the present embodiment, the monochromatic parameter is calculated for each frame image. Alternatively, the monochromatic parameter may be calculated for each field image.

Pursuant to the present embodiment, an embedment determination result for the present frame or field is employed. Alternatively, the use of an embedment determination result for the previous frame or field at a position earlier in time than the present frame or field provides beneficial effects that deter a delay in output of a signal of video having the digital watermarks embedded therein, with reference to the entered video signal.

Pursuant to the present embodiment, a sum of luminance values and a sum of differential absolute values of horizontally and vertically neighboring pixels are used as characteristic amounts. Alternatively, an average of luminance components or otherwise a combination of the former may be used. At any rate, the characteristic amount is not limited to those discussed in the present embodiment, but the characteristic amount for use in calculating the monochromatic parameter must be digitalized image complexity.

Pursuant to the present embodiment, the increasing function that treats a sum of differential absolute values of horizontally and vertically neighboring pixels as a variable is used to calculate the monochromatic parameter. Alternatively, any function handling a characteristic amount indicative of image complexity as a variable may be selected.

Third Embodiment

A third embodiment of the present invention is now described with reference to the drawings. Although the first and second embodiments embed digital watermarks into the entire target image subject to digital watermark embedment, the present embodiment divides the target image into several local regions, and then embeds the digital watermarks at the local regions of the target image.

Figure 5:
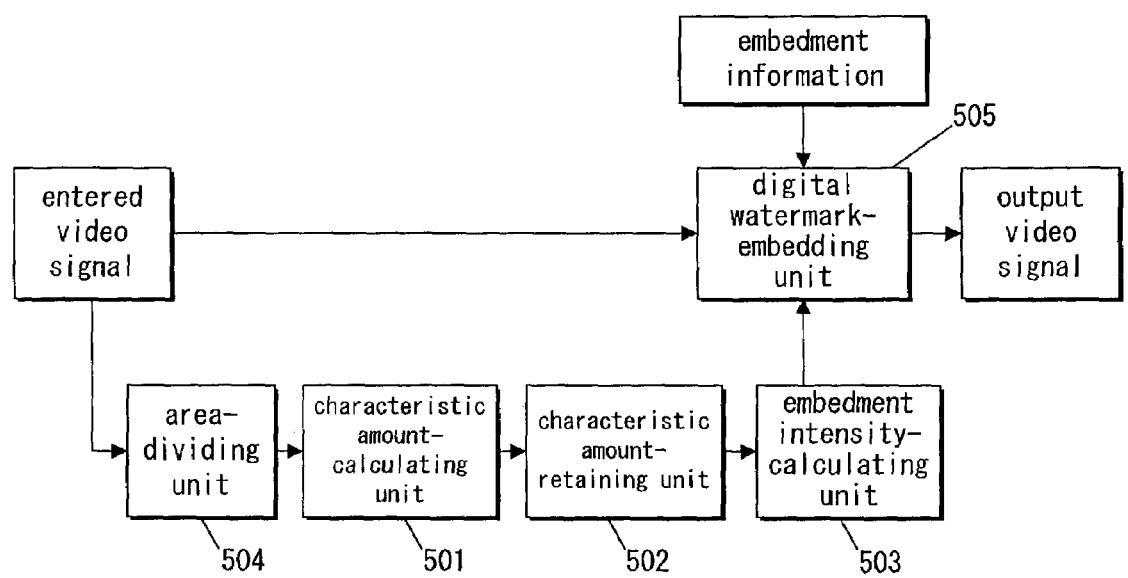
FIG. 5 is a block diagram, illustrating an exemplary digital watermark-embedding apparatus according to a third embodiment.

FIG. 5 is a block diagram, illustrating a digital watermark-embedding apparatus according to the present embodiment.

As illustrated in FIG. 5, the digital watermark-embedding apparatus includes an area-dividing unit 504, a characteristic amount-calculating unit 501, a characteristic amount-retaining unit 502, an embedment intensity-calculating unit 503, and a digital watermark-embedding unit 505.

The area-dividing unit 504 divides a target image subject to digital watermark embedment into several local regions.

The characteristic amount-calculating unit 501 calculates a characteristic amount for each of the local regions divided by the area-dividing unit 504. The characteristic amount-retaining unit 502 retains a characteristic amount for each of the local regions. The embedment intensity-calculating unit 503 calculates embedment intensity for each of the local regions.

The digital watermark-embedding unit 505 embeds the digital watermarks into each of the local regions divided by the area-dividing unit 504.

Figure 6:
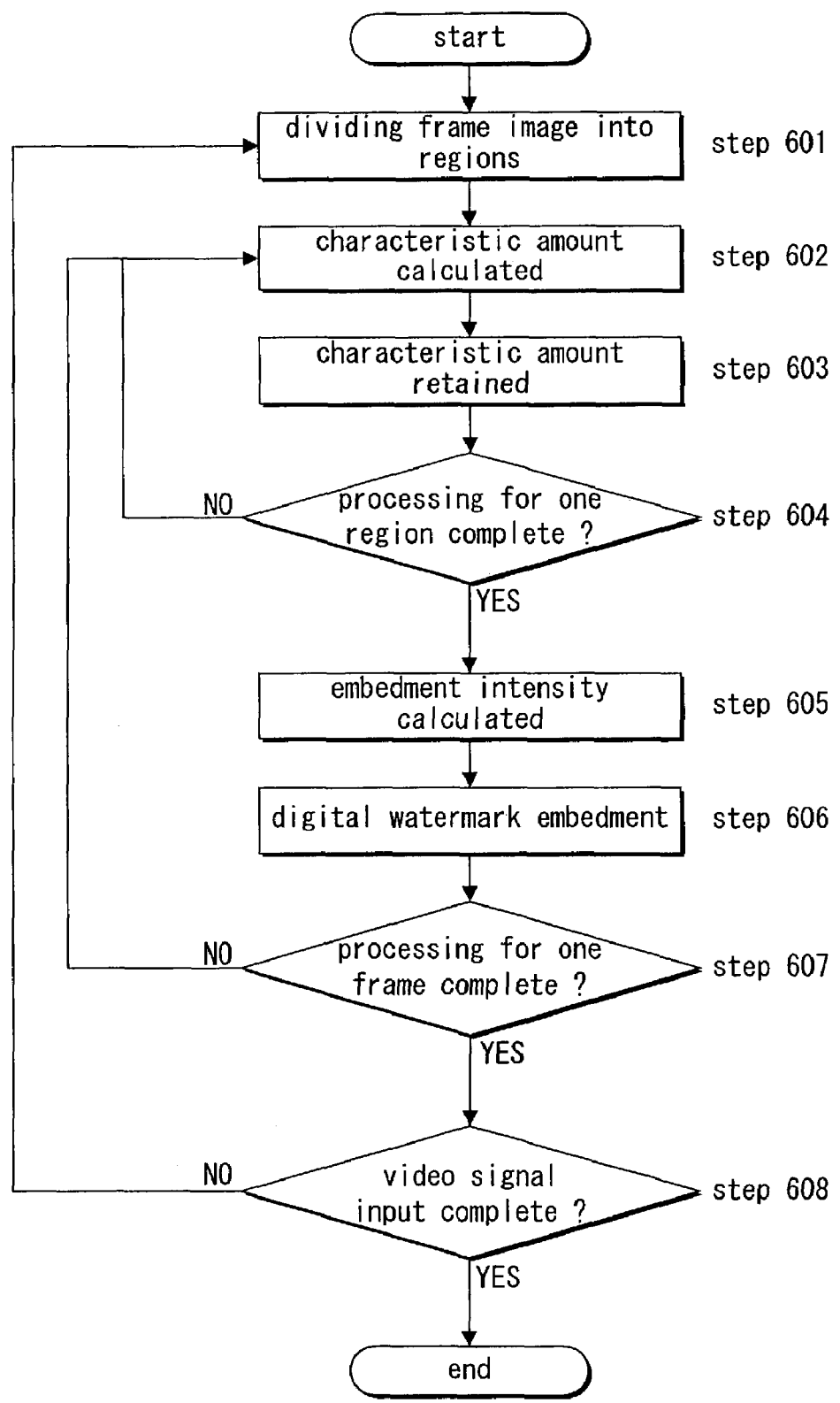
FIG. 6 is an exemplary flowchart, illustrating how the digital watermark-embedding apparatus of FIG. 5 is operated.

The following discusses, with reference to FIGS. 5 and 6, the way in which digital watermark embedment according to the present embodiment is executed. FIG. 6 is an exemplary flowchart, illustrating how the digital watermark-embedding apparatus of FIG. 5 is operated.

At step 601, the area-dividing unit 504 divides a target image subject to digital watermark embedment in an entered video signal into several local regions. The target image according to the present embodiment is a frame image. Each of the local regions is made up of plural pixels. According to the present embodiment, the frame image is divided into four regions by bisecting the frame image horizontally and vertically. Alternatively, the frame image may be divided in another manner.

At step 602, the characteristic amount-calculating unit 501 calculates a characteristic amount for one of the divided local regions. At step 603, the characteristic amount-retaining unit 502 retains the calculated characteristic amount. Pursuant to the present embodiment, a sum of luminance values is employed as a characteristic amount.

At step 604, the characteristic amount-calculating unit 501 determines whether or not the processing according to steps 602 and 603 for the present local region has been completed. When the determination in step 604 results in "YES", then at step 605, the embedment intensity-calculating unit 503 calculates embedment intensity on the basis of the retained characteristic amount for the present local region. Pursuant to the present embodiment, the embedment intensity is calculated using a function that treats a sum of luminance values for one region as a variable. When the determination in step 604 results in "NO", then the processing from steps 602 to 604 is repeated.

At step 606, the digital watermark-embedding unit 505 embeds given embedment information as digital watermarks into the target image at the present local region. At this time, the embedment information is embedded in accordance with the embedment intensity calculated by the embedment intensity-calculating unit 503. As a result, a signal of video having the digital watermarks embedded therein at the present local region is produced.

At step 607, the characteristic amount-calculating unit 501 determines whether or not the processing from steps 602 to 606 for all of the local regions of one frame has been completed. When the determination in step 607 results in "YES", then the routine is advanced to step 608. When the determination in step 607 results in "NO", then the processing from steps 602 to 607 is repeated.

At step 608, the digital watermark-embedding unit 503 determines whether or not video signal input has been completed. When the determination in step 608 results in "YES", then the entire processing is terminated. When the determination in step 608 results in "NO", then the routine is returned to step 601 to continue the processing.

As described above, the digital watermark-embedding apparatus according to the present embodiment divides the image in the entered video signal into four regions for each frame image, and then calculates the embedment intensity for each of the divided four regions.

This feature eliminates deviation in amount of digital watermark embedment-caused variations in pixel values within the image, and provides increased digital watermark robustness against image processing.

Pursuant to the present embodiment, the local regions are divided within the frame image. Alternatively, the local regions may be divided within a field image.

Pursuant to the present embodiment, the frame image is divided into the four local regions by bisecting the frame image horizontally and vertically. However, the number of division is not limited to that according to the present embodiment.

Pursuant to the present embodiment, the embedment intensity is calculated for each of the local regions obtained by dividing the present frame image, thereby embedding the digital watermarks into the present frame image. Alternatively, embedment intensity for the previous frame image at each corresponding local region thereof may be used, in which the previous frame image is located at a position earlier in time than the present frame image. This alternative restrains a time delay.

Pursuant to the present embodiment, a sum of luminance values is employed as a characteristic amount. Alternatively, an average of luminance components, a sum of differential absolute values of horizontally and vertically neighboring pixels, or a combination of the former may be used. At any rate, the characteristic amount is not limited to those discussed in the present embodiment.

Pursuant to the present embodiment, a function that treats a sum of luminance values as a variable is used to calculate the embedment intensity. Alternatively, any function handling the characteristic amount as a variable may be selected.

Assume that the image is divided into a substantial number of local regions (e.g., eight or greater local regions). In this instance, some of the local regions may share the information or intensity of the digital watermarks to be embedded. As a further alternative, some of the local regions may be free of the digital watermarks to be embedded therein. These alternatives are well acceptable in view of practical use, and are encompassed by the present invention.

Fourth Embodiment

A fourth embodiment of the present invention is now described with reference to the drawings. Pursuant to the present embodiment, digital watermarks are embedded into a target image subject to digital watermark embedment in accordance with a difference between two selected images. The two selected images include the target image or otherwise another image located at a position earlier, with respect to a time axis, than the target image.

The present frame image and an adjacent frame image nearest, with respect to the time axis, to the present frame image are preferably selected as these two images because such a selection makes it feasible to suppress degradation in image quality in a less diversified image.

Alternatively, the previous frame image at a position earlier in time than the present frame image (e.g., the adjacent frame image nearest in time to the present frame image) and a further frame image at a position earlier, with respect to the time axis, than the previous frame image as just discussed may be selected as two images because such an alternative selection also satisfies full practical use, and restrains a time delay. This alternative is also encompassed by the present invention.

Figure 7:
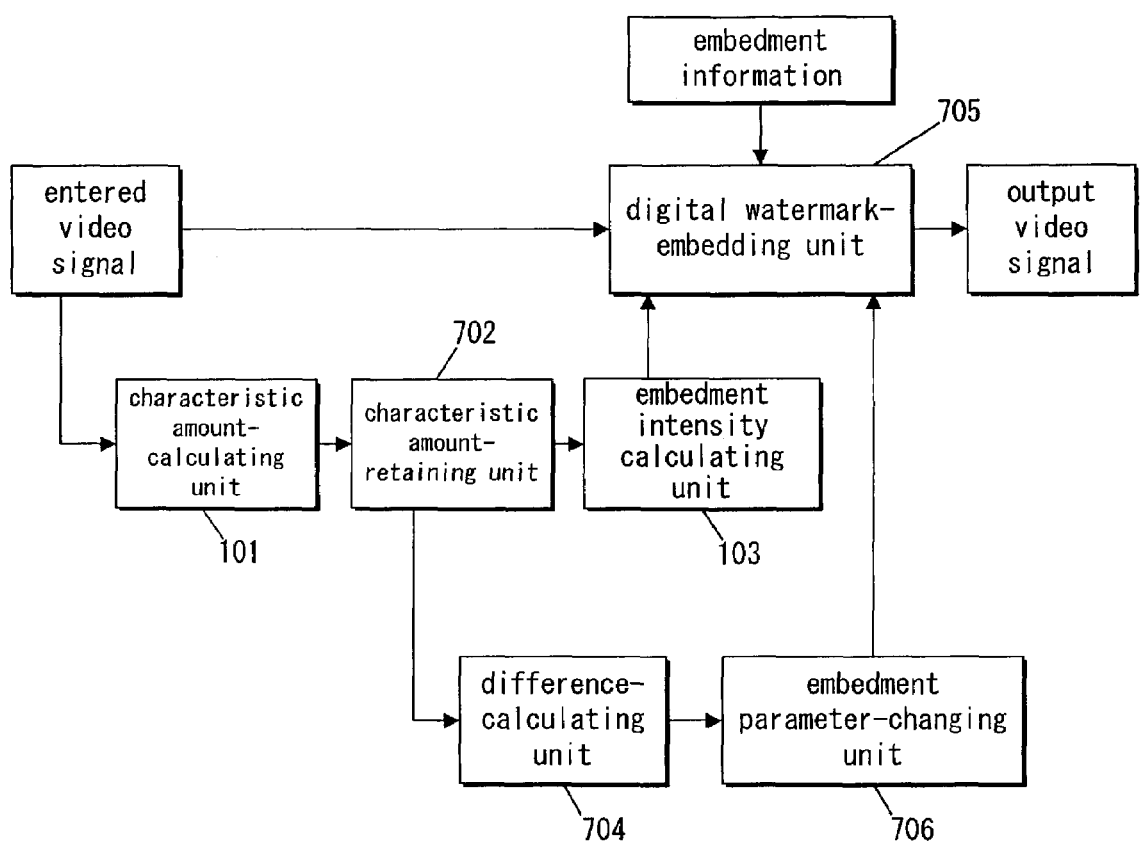
FIG. 7 is a block diagram, illustrating an exemplary digital watermark-embedding apparatus according to a fourth embodiment.

FIG. 7 is a block diagram, illustrating a digital watermark-embedding apparatus according to the present embodiment.

As illustrated in FIG. 7, the digital watermark-embedding apparatus includes a characteristic amount-calculating unit 101, a characteristic amount-retaining unit 702, an embedment intensity-calculating unit 103, a difference-calculating unit 704, an embedment parameter-changing unit 706, and a digital watermark-embedding unit 705.

The characteristic amount-retaining unit 702 has a region to retain a value of a difference in characteristic amount between two selected images as discussed above in order to handle the difference. The characteristic amount-calculating unit 101 calculates one characteristic amount for one of the two images and another for the other.

The difference-calculating unit 704 calculates the value of the difference in characteristic amount between the two selected images, in which the characteristic amounts for the two images are retained in the characteristic amount-retaining unit 702.

The embedment parameter-changing unit 706 compares the difference value with a threshold. When the difference value is equal or less than the threshold, then the embedment parameter-changing unit 706 changes an embedment parameter for use in digital watermark embedment.

The digital watermark-embedment unit 705 embeds digital watermarks into a target image subject to digital watermark embedment in accordance with embedment intensity calculated by the embedment intensity-calculating unit 103 and the embedment parameter set by the embedment parameter-changing unit 706.

Figure 8:
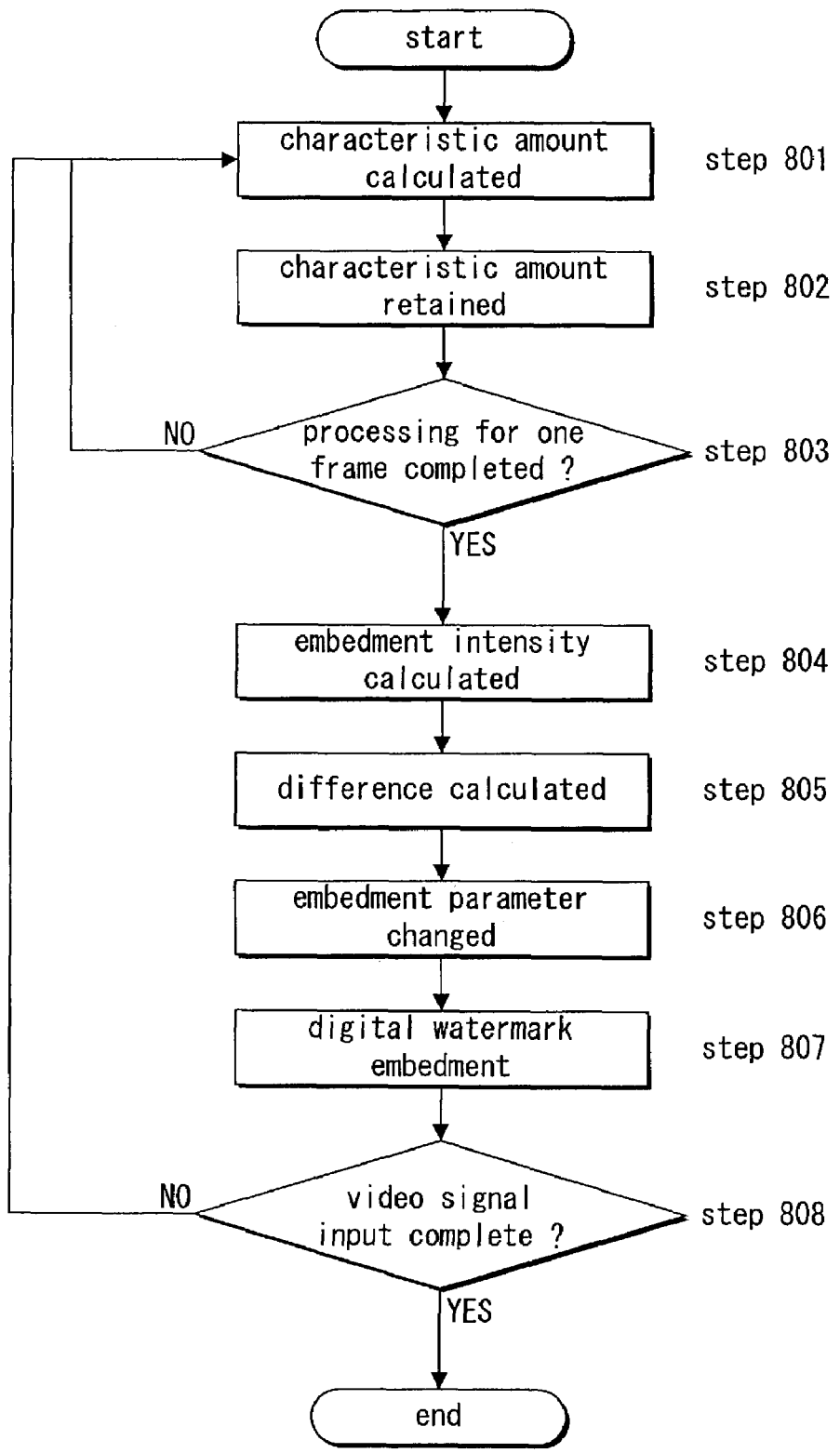
FIG. 8 is an exemplary flowchart, illustrating how the digital watermark-embedding apparatus of FIG. 7 is run.
Figure 9:
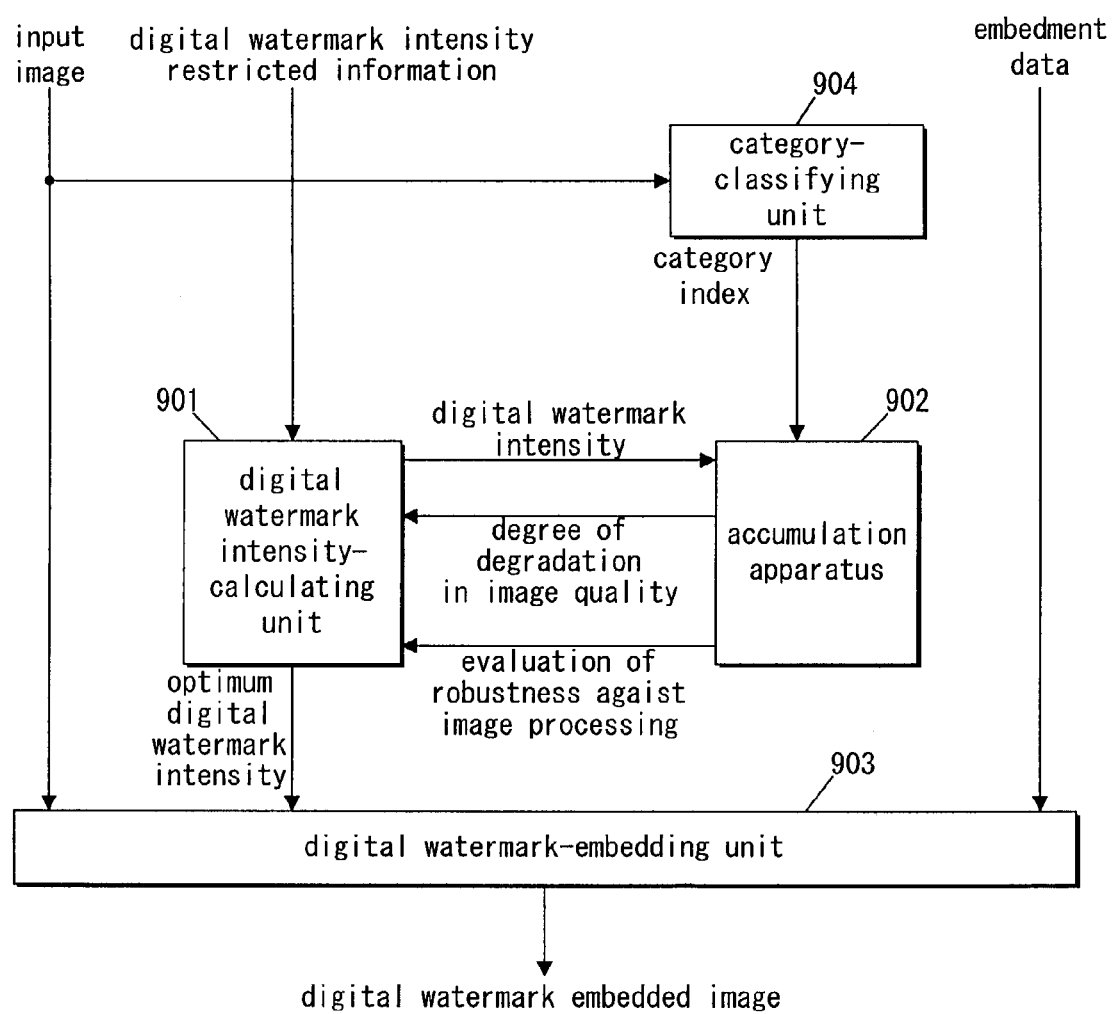
FIG. 9 is a block diagram, illustrating a prior art digital watermark-embedding apparatus.

The following discusses, with reference to FIGS. 7 and 8, the way in which digital watermark embedment according to the present embodiment is executed. FIG. 8 is an exemplary flowchart, illustrating how the digital watermark-embedding apparatus of FIG. 7 is run.

At step 801, the characteristic amount-calculating unit 101 calculates a characteristic amount from a target image subject to digital watermark embedment in an entered video signal. At step 802, the characteristic amount-retaining unit 702 retains the calculated characteristic amount. According to the present embodiment, a sum of luminance values is employed as a characteristic amount.

At step 803, the characteristic amount-calculating unit 101 determines whether or not the processing from steps 801 to 802 for one frame has been completed. When the determination in step 803 results in "YES", then at step 804, the embedment intensity-calculating unit 103 calculates embedment intensity on the basis of the characteristic amount retained in the characteristic amount-retaining unit 702. Pursuant to the present embodiment, the embedment intensity is calculated using a function that treats a sum of luminance values for one frame as a variable. When the determination in step 803 results in "NO", then the processing from steps 801 to 803 is repeated.

At step 805, the difference-calculating unit 704 calculates a value of a difference in characteristic amount between two selected images as discussed above.

At step 806, the embedment parameter-changing unit 706 determines whether or not the difference value is equal to or less than a threshold. When the determination in step 806 results in "YES", then the embedment parameter-changing unit 706 changes an embedment parameter for use in digital watermark embedment.

The difference value increases with increasing motion in video. Pursuant to the present embodiment, the threshold is determined to avoid perceiving a difference between the present frame image and the previous frame image when the different value is at most equal to the threshold. The previous frame image is located at a position earlier in time than the present frame image. Pursuant to the present embodiment, the variable embedment parameter is set as an overlaid frame number, but this is offered merely for purposes of illustration.

The overlaid frame number refers to the number of frames in which the same information is successively embedded. For example, when the overlaid frame number is two, then the same information is embedded in two frames in which one follows the other with reference to a time axis. In other words, different pieces of information are embedded for each two frames.

For a less diversified image such as a still image, an increased overlaid frame number (e.g., three hundred) suppresses image quality degradation or, e.g., a flicker effect.

According to the present embodiment, a predetermined ordinary value (small value) is set as an overlaid frame number. When the difference value is equal or less than the threshold at step 806, then the overlaid frame number is increased to inhibit degradation in image quality. When the difference value is greater than the threshold, then the overlaid frame number is set to be the ordinary value.

At step 807, the digital watermark-embedding unit 705 embeds given embedment information as digital watermarks into the target image subject to digital watermark embedment. At this time, the given embedment information is embedded in accordance with the embedment intensity calculated by the embedment intensity-calculating unit 103 and the embedment parameter set by the embedment parameter-changing unit 706. As a result, a signal of video having the digital watermarks embedded therein is produced.

At step 808, the digital watermark-embedding unit 705 determines whether or not the video signal input has been completed. When the determination in step 808 results in "YES", then the entire processing is terminated. When the determination in step 808 results in "NO", then the processing from steps 801 to 808 is repeated.

As described above, the digital watermark-embedding apparatus according to the present embodiment changes the embedment parameter for use in digital watermark embedment, or rather the overlaid frame number, in accordance with the value of the difference in characteristic amount between the two selected images. This feature deters degradation in image quality in a less diversified image.

For example, when different pieces of information for each frame are embedded as digital watermarks, there are cases where image quality degradation unperceivable in moving video may be perceivable in less moving video. For such less moving video, an increase in overlaid frame number inhibits apparent degradation in image quality.

Pursuant to the present embodiment, the difference value is calculated for each frame image. Alternatively, the difference value may be calculated for each field image.

As a further alternative, an embedment parameter for the previous frame or field at a position earlier in time than the present frame or field may be used instead of the embedment parameter for the present frame or field. This alternative inhibits a time delay.

Pursuant to the present embodiment, a sum of luminance values is employed as a characteristic amount. Alternatively, an average of luminance components, a sum of differential absolute values of horizontally and vertically neighboring pixels, or otherwise a combination of the former may be used. The increased number of characteristic amount combinations to calculate the value of the difference in characteristic amount provides increased reliability. At any rate, the characteristic amount is not limited to those discussed in the present embodiment.

Pursuant to the present embodiment, a function that treats a sum of luminance values as a variable is employed to calculate the embedment intensity. Alternatively, any function that handles the characteristic amount as a variable may be selected.

According to the present embodiment, it is determined on the basis of a threshold of zero as to whether the embedment parameter must be changed. This feature makes it feasible to identify completely motionless video or rather still video.

The first to fourth embodiments have been all described. Typically, each of the digital watermark-embedding apparatuses according to the first to fourth embodiments is functioned by a storage unit (e.g., ROM, RAM, and a hard disc), which contains predetermined program data, and a CPU (central processing unit) for executing the program data. Each piece of the program data may be introduced through a storage medium such as a CD-ROM and a flexible disc, or otherwise may be written in the ROM from the beginning.

A feature of the present invention is that digital watermarks are embedded in accordance with embedment intensity calculated from the previous frame or field image at a position earlier in time than the present frame or field image. This feature inhibits a delay in output of an output image with reference to an input image.

Another feature of the present invention is that no digital watermarks are embedded into a monotonous image with reference to a parameter that expresses image complexity in numerical terms. This feature makes it difficult to analyze the digital watermarks, and suppresses degradation in image quality.

A yet further feature of the present invention is that an image is divided into plural local regions to calculate embedment intensity for each of the divided local regions. This feature eliminates deviation in amount of digital watermark embedment-caused variations within the image, and provides enhanced digital watermark robustness against image processing.

A still further feature of the present invention is that digital watermarks are embedded in accordance with a difference calculated from two selected images. The two selected images include a target image subject to digital watermark embedment or otherwise another image located at a position earlier in time than the target image. This feature suppresses degradation in image quality in a less diversified image.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A digital watermark-embedding apparatus operable to embed a digital watermark into a target image subject to digital watermark embedment in an entered video signal, comprising:

a characteristic amount-calculating unit operable to calculate a characteristic amount of an earlier different image located at a position earlier, with respect to a time axis, than the target image;
an embedment intensity-calculating unit operable to calculate embedment intensity based on the characteristic amount of the earlier different image calculated by said characteristic amount-calculating unit; and
a digital watermark-embedding unit operable to embed the digital watermark into the target image with reference to the embedment intensity calculated by said embedment intensity-calculating unit.

2. A digital watermark-embedding apparatus as defined in claim 1, wherein the earlier different image is one of an adjacent field image and an adjacent frame image, each of which is positioned nearest, with respect to the time axis, to the target image.

3. A digital watermark-embedding apparatus as defined in claim 1,
wherein said characteristic amount-calculating unit calculates the characteristic amount for the target image from the entered video signal;
wherein said embedment intensity-calculating unit calculates the embedment intensity based on the characteristic amount of the target image calculated by said characteristic amount-calculating unit; and
wherein said digital watermark-embedding unit is operable to embed the digital watermark into the target image in accordance with the embedment intensity calculated by said embedment intensity-calculating unit.

4. A digital watermark-embedding apparatus according to claim 1, further comprising:
a parameter-calculating unit operable to calculate a parameter that shows image complexity;
wherein said characteristic amount-calculating unit calculates a characteristic amount of the earlier different image, based on the parameter that shows image complexity of the earlier different image.

5. A digital watermark-embedding apparatus as defined in claim 4, wherein said digital watermark-embedding unit embeds the digital watermark into the target image with reference to the earlier different image.

6. A digital watermark-embedding apparatus as defined in claim 1, further comprising:
an area-dividing unit operable to divide the earlier different image into several local regions;
wherein said characteristic amount-calculating unit calculates a characteristic amount of one of the several local regions of the earlier different image.

7. A digital watermark-embedding apparatus as defined in claim 1,
wherein said characteristic amount-calculating unit calculates a characteristic amount of another different image located at a position earlier, with respect to the time axis, than the target image;
wherein said embedment intensity-calculating unit calculates embedment intensity based on the difference between the characteristic amount of the earlier difference image and the characteristic amount of the another different image; and
wherein said digital watermark-embedding unit embeds the digital watermark into the target image with reference to the embedment intensity calculated by said embedment intensity-calculating unit.

8. A digital watermark-embedding apparatus as defined in claim 7, wherein the earlier different image and the another different image are an adjacent image positioned nearest, with respect to the time axis, to the target image.

9. A digital watermark-embedding method for embedding a digital watermark into a target image subject to digital watermark embedment in an entered video signal, comprising:
calculating a characteristic amount of an earlier different image located at a position earlier, with respect to a time axis, than the target image;
calculating embedment intensity based on the characteristic amount of the earlier different image calculated by said characteristic amount-calculating unit, and
embedding the digital watermark into the target image with reference to the embedment intensity calculated by said embedment intensity-calculating unit.

10. A digital watermark-embedding method as defined in claim 9, wherein the earlier different image is one of an adjacent field image and an adjacent frame image, each of which is positioned nearest, with respect to the time axis, to the target image.

11. A digital watermark-embedding method as defined in claim 9,
wherein said calculating of a characteristic amount calculates the characteristic amount for the target image from the entered video signal;
wherein said calculating of embedment intensity calculates embedment intensity based on the calculated characteristic amount of the target image; and
wherein said embedding embeds the digital watermark into the target image in accordance with the calculated embedment intensity.

12. A digital watermark-embedding method as defined in claim 9, further comprising:
calculating a parameter that shows image complexity,
wherein said calculating of a characteristic amount calculates the characteristic amount of the earlier different image, based on the parameter that shows the image complexity of the earlier different image.

13. A digital watermark-embedding method as defined in claim 12, wherein the digital watermark is embedded into the target image with reference to a the earlier different image.

14. A digital watermark-embedding method as defined in claim 9, further comprising:
dividing the earlier different image into several local regions;
wherein said calculating of a characteristic amount calculates a characteristic amount of one of the several local regions of the earlier different image.

15. A digital watermark-embedding method as defined in claim 9
wherein said calculating of a characteristic amount calculates a characteristic amount of another different image located at a position earlier, with respect to the time axis, than the target image;
wherein said calculating of an embedment intensity calculates embedment intensity based on the difference between the characteristic amount of the earlier different image and the characteristic amount of the another different image; and
wherein said embedding embeds the digital watermark into the target image with reference to the calculated embedment intensity.

16. A digital watermark-embedding method as defined in claim 15, wherein the earlier different image and the another different image are and an adjacent image positioned nearest, with respect to the time axis, to the target image.

17. A recording medium having a computer readable program recorded therein, the computer readable program being operable to cause a computer to perform the digital watermark-embedding method as defined in claim 9.

18. A recording medium having a computer readable program recorded therein, the computer readable program being operable to cause a computer to perform the digital watermark-embedding method as defined in claim 12.

19. A recording medium having a computer readable program recorded therein, the computer readable program being operable to cause a computer to perform the digital watermark-embedding method as defined in claim 14.

20. A recording medium having a computer readable program recorded therein, the computer readable program being operable to cause a computer to perform the digital watermark-embedding method as defined in claim 15.

* * * * *